(12) United States Patent
Dale

(10) Patent No.: US 7,529,543 B2
(45) Date of Patent: May 5, 2009

(54) CONFIGURING A DEVICE USING A CONFIGURATION MANAGER

(75) Inventor: Jonathan Dale, San Francisco, CA (US)

(73) Assignee: Fujitsu Limited, Kawasaki (JP)

( * ) Notice: Subject to any disclaimer, the term of this patent is extended or adjusted under 35 U.S.C. 154(b) by 484 days.

(21) Appl. No.: 11/048,246

(22) Filed: Jan. 31, 2005

(65) Prior Publication Data
US 2006/0199610 A1    Sep. 7, 2006

(51) Int. Cl.
H04M 3/00 (2006.01)
G06F 15/177 (2006.01)
G06F 7/00 (2006.01)

(52) U.S. Cl. .............................. 455/419; 709/220; 707/3

(58) Field of Classification Search ................. 709/222, 709/228, 250; 455/419
See application file for complete search history.

(56) References Cited

U.S. PATENT DOCUMENTS

| | | | | |
|---|---|---|---|---|
| 5,596,723 | A * | 1/1997 | Romohr | 709/222 |
| 6,047,376 | A * | 4/2000 | Hosoe | 726/5 |
| 6,088,738 | A * | 7/2000 | Okada | 709/245 |
| 6,263,387 | B1 * | 7/2001 | Chrabaszcz | 710/302 |
| 6,412,025 | B1 * | 6/2002 | Cheston et al. | 710/8 |
| 6,546,261 | B1 * | 4/2003 | Cummings | 455/552.1 |
| 6,765,916 | B1 * | 7/2004 | Duvvuru et al. | 370/395.5 |
| 6,801,507 | B1 * | 10/2004 | Humpleman et al. | 370/257 |
| 7,016,668 | B2 * | 3/2006 | Vaidyanathan et al. | 455/418 |
| 7,051,087 | B1 * | 5/2006 | Bahl et al. | 709/220 |
| 2002/0133573 | A1 * | 9/2002 | Matsuda et al. | 709/220 |
| 2004/0010574 | A1 * | 1/2004 | Cammick et al. | 709/222 |
| 2004/0127197 | A1 * | 7/2004 | Roskind | 455/412.2 |
| 2005/0256958 | A1 * | 11/2005 | Wilson | 709/227 |

FOREIGN PATENT DOCUMENTS

| | | |
|---|---|---|
| CN | 1460373 | 12/2003 |
| CN | 1501279 | 6/2004 |

OTHER PUBLICATIONS

Gellens, R., "*Wireless Device Configuration (OTASP/OTAPA) via ACAP*", Network Working Group, Request for Comments: 2636, Category: Informational, pp. 1-32, Jul. 1999.

Miller, Franz, "*Wired and Smart: from the Fridge to the Bathtub*", Special Theme: Ambient Intelligence, ERCIM News No. 47, 3 pages, Oct. 2001.

(Continued)

Primary Examiner—Alexander Eisen
Assistant Examiner—Huy C Ho
(74) Attorney, Agent, or Firm—Baker Botts L.L.P.

(57) ABSTRACT

Configuring a configurable device includes determining that the configurable device has initiated interaction with an environment. The configurable device is queried to obtain a device request. The device request is made by the configurable device to obtain configuration values for specific configuration parameters. A preference indicates a configuration value for a configuration parameter, and a set of preferences includes at least one of a user preference, a device-specific preference, and an environment-specific preference. The configuration values for the specific configuration parameters are identified according to the set of preferences. A configuration instruction providing the configuration values for specific configuration parameters is generated and transmitted to the configurable device.

20 Claims, 2 Drawing Sheets

OTHER PUBLICATIONS

Giguère, Eric, "*The Connected Limited Device Configuration (CLDC)*", cloudscape, www.developer.com/ws/article.php/1436051, 3 pages, Jul. 30, 2002.

"*Documentation Chapter 5: Remote Device Configuration (PDA)*", Maximized Software, GoPop, © 1995-2005 Maximized Software, Inc., 3 pages, Printed Jan. 2005.

"*The Silicon Trust Online*", Infineon's Partner Platform For Silicon Based Security Solutions, © 2005 Infineon Technologies AG, www.silicon-trust.com, 2 pages, Printed Jan. 2005.

Feng, Yu, "*Network Programming with J2ME Wireless Devices*", GPS Wireless 2005, Wireless Developer Network, www.wirelessdevnet.com/channels/java/features/j2me_http; 15 pages, Printed Jan. 2005.

Communication from The State Intellectual Property Office of China, First Notification of Office Action transmitted to Baker Botts via facsimile Feb. 20, 2008, for Application No. 200610003501.0, 20 pages.

* cited by examiner

CONFIGURING A DEVICE USING A CONFIGURATION MANAGER

TECHNICAL FIELD

This invention relates generally to the field of device configuration and more specifically to configuring a device using a configuration manager.

BACKGROUND

Certain communication devices may be configured in order to communicate with other devices. Devices may also be configured to reflect user preferences. Typically, a user manually configures a device. Manual configuration, however, may be inefficient in certain situations. It is generally desirable to have efficient configuration in certain situations.

SUMMARY OF THE DISCLOSURE

In accordance with the present invention, disadvantages and problems associated with previous techniques for device configuration may be reduced or eliminated.

According to one embodiment of the invention, configuring a configurable device includes determining that the configurable device has initiated interaction with an environment. The configurable device is queried to obtain a device request. The device request is made by the configurable device to obtain configuration values for specific configuration parameters. A preference indicates a configuration value for a configuration parameter, and a set of preferences includes at least one of a user preference, a device-specific preference, and an environment-specific preference. The configuration values for the specific configuration parameters are identified according to the set of preferences. A configuration instruction providing the configuration values for specific configuration parameters is generated and transmitted to the configurable device.

Certain embodiments of the invention may provide one or more technical advantages. A technical advantage of one embodiment may be that a configuration manager may configure a device that has initiated interaction with an environment. The configuration manager may configure the device according to preferences such as user preferences, device-specific preferences, environment-specific preferences, or other preferences. Another technical advantage of one embodiment may be that the configuration manager may detect when a device has initiated interaction with an environment, and automatically perform the configuration in response to the interaction. Another technical advantage of one embodiment may be that the configuration manager may learn the preferences as more devices are configured.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
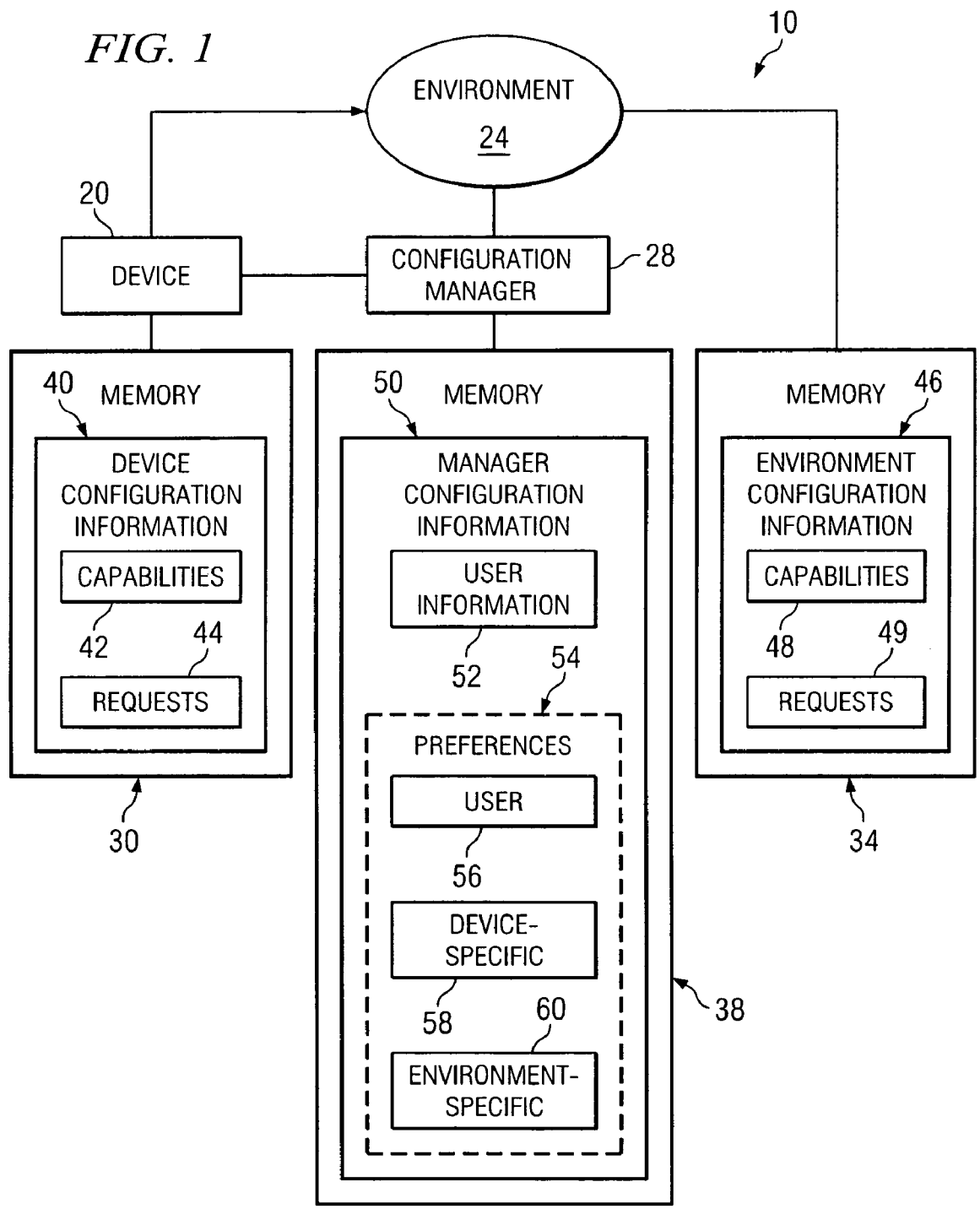
FIG. 1 is a block diagram illustrating one embodiment of a network that includes a configuration manager operable to configure a configurable device.
Figure 2:
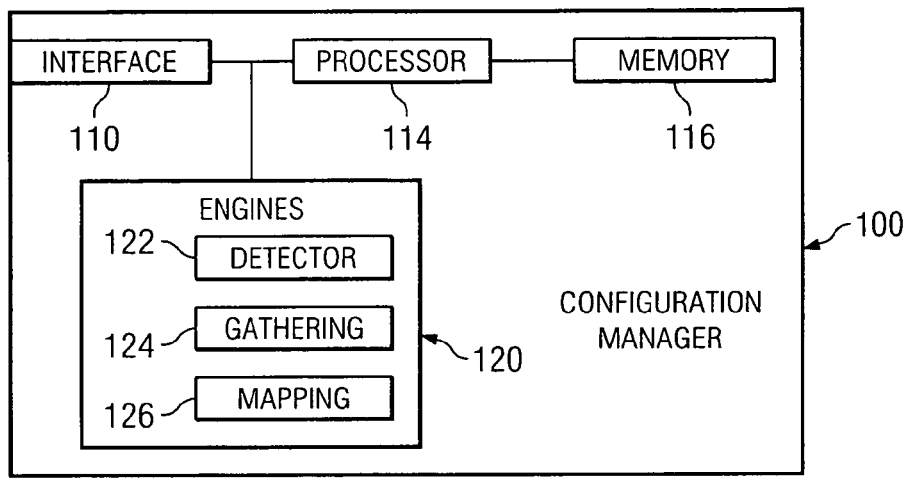
FIG. 2 is a block diagram illustrating one embodiment of a configuration manager that may be used with the network of FIG. 1.
Figure 3:
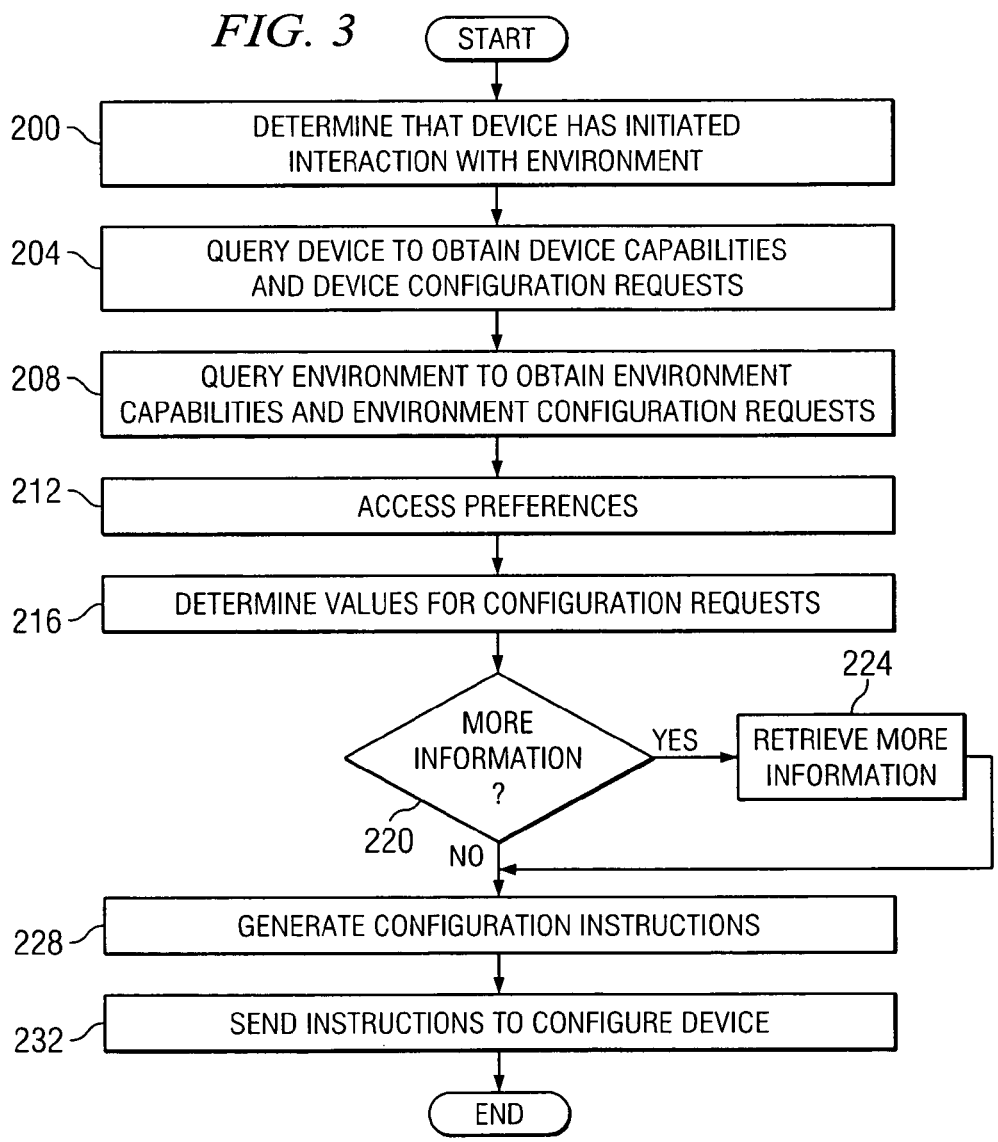
FIG. 3 is a flowchart illustrating one embodiment of a method that the configuration manager of FIG. 2 may use to configure a configurable device.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a network 10 that includes a configuration manager 28 operable to configure a configurable device 20. In general, network 10 includes configurable device 20 that enters an environment 24. Configuration manager 28 may be used to automatically configure device 20 in accordance with environment 24.

According to the illustrated embodiment, network 10 includes configurable device 20, configuration manager 28, and environment 24 coupled as shown. Device 20 is coupled to memory 30, configuration manager 28 is coupled to memory 38, and environment 24 is coupled to memory 34.

Configurable device 20 represents a device comprising any hardware, software, or combination of both operable to interact with environment 24. An interaction between configurable device 20 and environment 24 may refer to the communication of signals between configurable device 20 and environment 24. The signals may comprise control, media, or other type of signals. The signals may comprise packets communicating information such as data, audio, video, multimedia, any other suitable type of information, or any combination of the preceding.

Configurable device 20 may comprise, for example, a personal digital assistant (PDA), a cellular telephone, a mobile handset, a computer, MP3 player, or any other device suitable for communicating data to and from environment 24. Configurable device 20 may support, for example, Internet Protocol (IP), Session Initiation Protocol (SIP), or any other suitable communication protocol. Configurable device 20 may utilize any suitable mobile communication technology, for example, General Packet Radio Service (GPRS) technology.

Configurable device 20 may be configured. Configuration may refer to setting values for predefined configuration parameters. A configuration parameter may refer to a parameter that defines an operation of the logic of a device. Logic may comprise hardware, software, other logic, or any combination of the preceding. Examples of configuration parameters may include a communication protocol parameter, network connection parameter, operating system parameter, or other suitable parameter. A communication protocol parameter may be used to configure a device to communicate using a specific protocol. A value for the parameter may represent the specific protocol. A network connection parameter or an operating system parameter may be used to configure a device to communicate using a specific network connection or operating system.

Other example parameters may include a device interaction parameter, an application parameter, a synchronization parameter, and a user preference parameter. A device interaction parameter may be used to configure how a first device interacts with a second device such as a printer. An application parameter may be used to define a preferred application, such as a word processing application, for a device. A synchronization parameter may be used to define how a device interacts with an environment. User preference parameters may be as described with reference to memory 38. Memory 30 stores information describing device 20. Memory may refer to any hardware, software, other logic, or combination of the preceding for storing and facilitating retrieval of information. Memory may use any of a variety of data structures, arrangements, and compilations to store and facilitate retrieval of information. Memory may include Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

According to the illustrated embodiment, memory 30 includes device configuration information 40. Device configuration information 40 includes configuration information that may be used to configure device 20. Configuration information may refer to information that may be used to configure logic.

According to the illustrated embodiment, device configuration information 40 includes device capabilities 42 and device configuration requests 44. Device capabilities 42 describe the capabilities of device 20. A capability may refer to an ability of a first device that a second device may need in order to communicate with the first device. Examples of capabilities may include a preferred communication protocol, operating system, other capability, or any combination of the preceding. According to one embodiment, a capability may be expressed as a value of a configuration parameter. For example, the ability to communicate using a specific communication protocol may be expressed using the value representing the specific communication protocol.

Device capabilities 42 may include other suitable capabilities. For example, a music storage device such as an MP3 player may have a stream music capability indicating that the device can stream music to another device. A music playing device such as a stereo may have a play stream music capability indicating that the device can play streamed music.

As another example, a network router device may have a provide network capability indicating that the device can provide a network, such as the Internet, to another device. As yet another example, a printer device may have a print capability indicating that the device can print. As yet another example, a food storage device such as a refrigerator may have a monitor food capability, indicating that the device can monitor food, and an accept food orders capability, indicating that the device can accept food orders.

Device configuration requests 44 represent configuration requests for information requested by device 20. A configuration request may refer to a request that a first device may send to obtain information about a second device in order to communicate with the second device. As an example, a configuration request may request a value for a configuration parameter.

An environment 24 represents an area in which device 20 may operate and with which device 20 may interact. For example, environment 24 may represent a house, a car, an office, a yard, a hospital, an Internet cafe, a photocopier, a tourist information center, or other area. An environment 24 may have environment devices with which device 20 may communicate. An environment device may comprise, for example, a modem, an output device, other device that can communicate with device 20, or any combination of the preceding. A modem allows device 20 to access a communication network to communicate calls. An output device allows communication device 20 to output information in environment 24. As an example, an output may comprise a monitor, a display, a speaker, other output device, or any combination of the preceding.

Memory 34 stores information that describes environment 24. According to the illustrated embodiment, memory 34 includes environment configuration information 46. Environment configuration information 46 represents configuration information that may be used to configure a device of environment 24. Environment configuration information 46 may include environment capabilities 48 and environment configuration requests 49. Environment capabilities 46 describe the capabilities of environment 24. The capabilities of environment 24 may describe the sharable device capabilities of devices that have already been configured with environment 24. That is, once a device 20 has been configured with environment 24, the capabilities of device 20 are added to environment capabilities 46. The capabilities of device 20 may remain in environment capabilities 46 as long as device 20 remains in environment 24. Environment configuration requests 49 represent configuration requests for information requested by environment 24.

An environment 24 may have any suitable environment capabilities. As a first example, a hospital may not have a cell phone capability, since cell phones may interfere with medical equipment. As a second example, an Internet cafe may provide a broadband network support capability. As a third example, a photocopier may provide network and printing capabilities. As a fourth example, a tourist information center may provide restaurant information and reservation capabilities.

Configuration manager 28 operates to configure configurable device 20 to communicate in environment 24 according to preferences. According to one embodiment, configuration manager 28 queries configurable device 20 and environment 24 for configuration requests. Configuration manager 28 responds to the requests in accordance with the preferences. Configuration manager 28 is described in more detail with reference to FIG. 2.

Memory 38 stores information used by configuration manager 28. According to the illustrated embodiment, memory 38 stores manager configuration information 50. Manager configuration information 50 may refer to information that configuration manager 28 may use to configure device 20 and environment 24. According to the illustrated embodiment, manager configuration 50 includes user information 52 and predefined preferences 54.

User information 52 may represent information that is used to identify, describe, or both identity and describe the user of device 20. For example, user information may include a user identifier such as a user name, passcode, user address, other identifier for uniquely identifying the user, or any combination of the preceding. User information may also include personal information used by the user. For example, user information 52 may include a user address book, a user calendar or itinerary, other personal information, or any combination of the preceding.

Predefined preferences 54 represent preferences that may be used to configure configurable device 20. Predefined preferences 54 may be expressed as values for configuration parameters. The preferences may be supplied to memory 38 by a user or a database associated with a user. Memory 38 may also obtain the information when the user inputs information to manually configure device 20 or environment 24.

According to the illustrated embodiment, predefined preferences 54 include user preferences 56, device specific preferences 58, and environment-specific preferences 60. User preferences 54 describe services preferred by the user. For example, user preferences may describe a preferred brand of hotel, restaurant, service station, airline, or other business. User preferences may describe a preferred type of service, such a restaurant that serves a particular type of food, for example, Italian or Chinese food, or a restaurant with a specific average meal price. User preferences may describe hotel, airline, or restaurant reservation preferences.

Device-specific preferences 56 describe configuration settings of device 20 that may be preferred by the user. The preferences may include, for example, networking information, user interface configuration, other preference, or any combination of the preceding. The preferences may be expressed as values of configuration parameters.

Environment-specific preferences 58 may include configuration settings that may be preferred by the user. Preferences 58 may include, for example, a preferred radio station, television station, temperature, seat position, setting, other preference, or any combination of the preceding. The preferences may be expressed as values of configuration parameters.

According to one example, configurable devices 20 may include a network broadband router, a printer, a television and a refrigerator. Configurable devices 20 may have device requests 44 for environment capabilities 48. Examples device requests 44 may include a network request for a network capability, a printing request for a printing capability, or other suitable request. Environment 24 may have environment capabilities 48 such as a network capability. If a device request 44 and an environment capability 48 match, then device 20 can be configured by environment 24 for that particular environment capability 48.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic comprising software, hardware, other logic, or any suitable combination of the preceding.

FIG. 2 is a block diagram illustrating one embodiment of a configuration manager 100 that may be used with the network of FIG. 1. According to the illustrated embodiment, configuration manager 100 includes an interface 110, a processor 114, a memory 116, and engines 120 coupled as shown.

According to one embodiment, interface 110 allows configuration manager 100 to communicate with device 20 and environment 24. Interface 110 may include any hardware, software, other logic, or combination of the preceding for communicating with device 20 and environment 24, and may use any of a variety of computing structures, arrangements, or compilations to communicate with device 20 and environment 24. Memory 116 may be substantially similar to memory 38 of FIG. 1.

Engines 120 represent logic that may be used to configure device 20. According to the illustrated embodiment, engines 120 include a detection engine 122, a gathering engine 124, and a mapping engine 128. Detection engine 122 determines if device 20 has initiated interaction with environment 24. The determination may be made when configuration manager 100 receives signals from device 20 or environment 24, or both. As a first example, the signals may indicate that device 20 and environment 24 are communicating. As a second example, the signals may be received from environment 24, and may indicate that environment 24 has detected device 20. Detection of a first entity by a second entity may occur, for example, when the first entity has entered within a wireless detection range of the second entity, or when the first entity is coupled to the second entity. As a third example, the signals may be received from device 20, and may indicate that device 20 has detected environment 24.

Gathering engine 124 queries configurable device 20 and environment 24 for configuration requests to determine configuration information needed to configure device 20. The configuration requests may be expressed as requests for values of particular configuration parameters.

Mapping engine 128 receives the requests and generates responses to the request. The responses may include values for the requested configuration parameters. Mapping engine 128 may determine the values by searching the predefined preferences for values of the requested configuration parameters. Mapping engine 128 may also determine the values by requesting information about the capabilities of configurable device 20 and environment 24. Mapping engine 128 generates configuration instructions that include the values for the requested configuration parameters, and sends the configuration instructions to configurable device 20 and environment 24 to configure device 20. A method that may be used by configuration manager 28 is described in more detail with reference to FIG. 3.

Interface 110, processor 114, memory 116, and engines 120 may operate on one or more computers and may include appropriate input devices, output devices, mass storage media, processors, memory, or other components for receiving, processing, storing, and communicating information according to the operation of configuration manager 100. For example, the functions of interface 110, processor 114, memory 116, engines 120 or any combination of the preceding may be provided using a single computer system, for example, a personal computer. As used in this document, the term "computer" refers to any suitable device operable to execute instructions and manipulate data to perform operations, for example, a personal computer, work station, network computer, wireless telephone, personal digital assistant, one or more microprocessors within these or other devices, or any other suitable processing device.

Interface 110, processor 114, memory 116, and engines 120 may be integrated or separated according to particular needs. If any of interface 110, processor 114, memory 116, and engines 120 are separated, the separated components may be coupled to each other using a local area network (LAN), a metropolitan area network (MAN), a wide area network (WAN), a global computer network such as the Internet, or any other appropriate wire line, wireless, or other link.

Modifications, additions, or omissions may be made to system 100 without departing from the scope of the invention. The components of system 100 may be integrated or separated according to particular needs. All or a portion of system 100 may be integrated as one or more independent devices, or may be integrated as a part of one or more other devices. For example, all or a portion of system 100 may be included as a component of a vehicle, a computer, a personal digital assistant, or other device.

Moreover, the operations of system 100 may be performed by more, fewer, or other modules. For example, the operations of detector engine 122 and gathering engine 124 may be performed by one module, or the operations of mapping engine 128 may be performed by more than one module. Additionally, operations of system 100 may be performed using any suitable logic comprising software, hardware, other logic, or any suitable combination of the preceding.

FIG. 3 is a flowchart illustrating one embodiment of a method that the configuration manager of FIG. 2 may use to configure configurable device 20. The method starts at step 200, where configuration manager 28 determines that configurable device 20 has initiated interaction with environment 24. Detector engine 122 may detect that configurable device 20 has entered environment 24.

Device 20 is queried to obtain device capabilities and device configuration requests at step 204. Gathering engine 124 may perform the query. The device capabilities describe the capabilities of device 20. The device configuration requests indicate information needed by device 20 to configure device 20. The requests may be expressed as requests for values of configuration parameters.

Environment 24 is queried to obtain environment capabilities and environment configuration requests at step 208. The environment capabilities describe the capabilities of environment 24. The environment configuration requests indicate information needed by environment 24 to configure device 20. The requests may be expressed as requests for values of configuration parameters. According to one embodiment, gathering engine 124 may perform the query. According to another embodiment, device 20 may perform the query. In particular, device 20 may directly query a device of environment 24 for a capability that is not automatically shared.

Predefined preferences are accessed at step 212. Gathering engine 124 may access the preferences. Predefined preferences may include user preferences 56, device-specific preferences 58, and environment-specific preferences 60. Predefined preferences 54 may be expressed as values for configuration parameters.

Values for the requested configuration parameters are determined at step 216. Mapping engine 128 may determine the values by searching the predefined preferences and capabilities. More information may be required at step 220. If more information is required, the method proceeds to step 224, where more information is retrieved. Mapping engine 128 may request that gathering engine 124 to retrieve the information from device 20, environment 24, memory 38, other source, or any combination of the preceding.

If more information is not required, the method proceeds to step 228, where configuration instructions are generated. Mapping engine 128 may generate configuration instructions that include the values for the requested configuration parameters. The configuration instructions are sent to configurable device 20 and environment 24 to configure device 20 at step 132. Mapping engine 128 may send the configuration instructions. After sending the instructions, the method ends.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a configuration manager may configure a device that has initiated interaction with an environment. The configuration manager may configure the device according to preferences such as user preferences, device-specific preferences, environment-specific preferences, or other preferences. Another technical advantage of one embodiment may be that the configuration manager may detect when a device has initiated interaction with an environment, and automatically perform the configuration in response to the interaction. Another technical advantage of one embodiment may be that the configuration manager may learn the preferences as more devices are configured.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for configuring a configurable device, comprising:

determining at a configuration manager that a configurable device has initiated interaction with an environment by detecting that the configurable device has entered a wireless detection range of the environment;

querying the configurable device in response to the detection to obtain a device request, the device request representing a request made by the configurable device to obtain one or more configuration values for one or more specific configuration parameters of a plurality of configuration parameters;

accessing a set of preferences, a preference indicating a configuration value for a configuration parameter of the plurality of configuration parameters, the set of preferences comprising a device-specific preference and an environment-specific preference;

identifying the one or more configuration values for the one or more specific configuration parameters according to the set of preferences;

generating a configuration instruction, the configuration instruction providing the one or more configuration values for the one or more specific configuration parameters;

transmitting the configuration instruction to the configurable device, the one or more configuration values used to configure the configurable device; and adding a sharable device capability of the configurable device to a plurality of environment capabilities of the environment.

2. The method of claim 1, wherein determining at the configuration manager that the configurable device has initiated interaction with the environment further comprises:

receiving a signal from at least one of the configurable device and the environment, the signal indicating that the configurable device has detected the environment; and determining that the configurable device has initiated interaction with the environment in response to receiving the signal.

3. The method of claim 1, wherein determining at the configuration manager that the configurable device has initiated interaction with the environment further comprises:

receiving a signal from at least one of the configurable device and the environment, the signal indicating that the environment has detected the configurable device; and determining that the configurable device has initiated interaction with the environment in response to receiving the signal.

4. The method of claim 1, further comprising:

receiving the one or more configuration values for the one or more specific configuration parameters from configuration of a previous configurable device; and adding the one or more configuration values to the set of preferences.

5. The method of claim 1, wherein:

querying the configurable device to obtain the device request further comprises querying the configurable device to obtain a device capability, the device capability describing an ability of the configurable device, the device capability expressed as a configuration value of a configuration parameter; and identifying the one or more configuration values for the one or more specific configuration parameters according to the set preferences further comprises identifying the one or more configuration values for the one or more specific configuration parameters according to the set of preferences and the device capability.

6. The method of claim 1, wherein:
querying the configurable device to obtain the device request further comprises querying the environment to obtain an environment capability of the plurality of environment capabilities, the environment capability describing an ability a device of the environment, the environment capability expressed as a configuration value of a configuration parameter; and
identifying the one or more configuration value for the one or more specific configuration parameters according to the set of preferences further comprises identifying the one or more configuration values for the one or more specific configuration parameters according to the set of preferences and the environment capability.

7. A configuration manager for configuring a configurable device, comprising:
a memory operable to store a set of preferences, a preference indicating a configuration value for a configuration parameter of a plurality of configuration parameters, the set of preferences comprising a device-specific preference and an environment-specific preference; and
a processor coupled to the memory and operable to:
determine that a configurable device has initiated interaction with an environment by detecting that the configurable device has entered a wireless detection range of the environment;
query the configurable device in response to the detection to obtain a device request, the device request representing a request made by the configurable device to obtain one or more configuration values for one or more specific configuration parameters of the plurality of configuration parameters;
access the set of preferences;
identify the one or more configuration values for the one or more specific configuration parameters according to the set of preferences;
generate a configuration instruction, the configuration instruction providing the one or more configuration values for the one or more specific configuration parameters;
transmit the configuration instruction to the configurable device, the one or more configuration values used to configure the configurable device; and
add a sharable device capability of the configurable device to a plurality of environment capabilities of the environment.

8. The manager of claim 7, the processor further operable to determine at the configuration manager that the configurable device has initiated interaction with the environment by:
receiving a signal from at least one of the configurable device and the environment, the signal indicating that the configurable device has detected the environment; and
determining that the configurable device has initiated interaction with the environment in response to receiving the signal.

9. The manager of claim 7, the processor further operable to determine at the configuration manager that the configurable device has initiated interaction with the environment by:

receiving a signal from at least one of the configurable device and the environment, the signal indicating that the environment has detected the configurable device; and
determining that the configurable device has initiated interaction with the environment in response to receiving the signal.

10. The manager of claim 7, the processor further operable to:
receive the one or more configuration values for the one or more specific configuration parameters from configuration of a previous configurable device; and
add the one or more configuration values to the set of preferences.

11. The manager of claim 7, the processor further operable to:
query the configurable device to obtain the device request by querying the configurable device to obtain a device capability, the device capability describing an ability of the configurable device, the device capability expressed as a configuration value of a configuration parameter; and
identify the one or more configuration values for the one or more specific configuration parameters according to the set of preferences by identifying the one or more configuration values for the one or more specific configuration parameters according to the set of preferences and the device capability.

12. The manager of claim 7, the processor further operable to:
query the configurable device to obtain the device request by querying the environment to obtain an environment capability of the plurality of environment capabilities, the environment capability describing an ability a device of the environment, the environment capability expressed as a configuration value of a configuration parameter; and
identify the one or more configuration values for the one or more specific configuration parameters according to the set of preferences by identifying the one or more configuration values for the one or more specific configuration parameters according to the set of preferences and the environment capability.

13. One or more computer readable media storing software for configuring a configurable device, when executed by a computer operable to:
determine at a configuration manager that a configurable device has initiated interaction with an environment by detecting that the configurable device has entered a wireless detection range of the environment;
query the configurable device in response to the detection to obtain a device request, the device request representing a request made by the configurable device to obtain one or more configuration values for one or more specific configuration parameters of a plurality of configuration parameters;
access a set of preferences, a preference indicating a configuration value for a configuration parameter of the plurality of configuration parameters, the set of preferences comprising a device-specific preference and an environment-specific preference;
identify the one or more configuration values for the one or more specific configuration parameters according to the set of preferences;

generate a configuration instruction, the configuration instruction providing the one or more configuration values for the one or more specific configuration parameters;

transmit the configuration instruction to the configurable device, the one or more configuration values used to configure the configurable device; and add a sharable device capability of the configurable device to a plurality of environment capabilities of the environment.

14. The computer readable media of claim 13, further operable to determine at the configuration manager that the configurable device has initiated interaction with the environment by:

receiving a signal from at least one of the configurable device and the environment, the signal indicating that the configurable device has detected the environment; and determining that the configurable device has initiated interaction with the environment in response to receiving the signal.

15. The computer readable media of claim 13, further operable to determine at the configuration manager that the configurable device has initiated interaction with the environment by:

receiving a signal from at least one of the configurable device and the environment, the signal indicating that the environment has detected the configurable device; and determining that the configurable device has initiated interaction with the environment in response to receiving the signal.

16. The computer readable media of claim 13, further operable to:

receive the one or more configuration values for the one or more specific configuration parameters from configuration of a previous configurable device; and add the one or more configuration values to the set of preferences.

17. The computer readable media of claim 13, further operable to:

query the configurable device to obtain the device request by querying the configurable device to obtain a device capability, the device capability describing an ability of the configurable device, the device capability expressed as a configuration value of a configuration parameter; and identify the one or more configuration values for the one or more specific configuration parameters according to the set of preferences by identifying the one or more configuration values for the one or more specific configuration parameters according to the set of preferences and the device capability.

18. The computer readable media of claim 13, further operable to:

query the configurable device to obtain the device request by querying the environment to obtain an environment capability of the plurality of environment capabilities, the environment capability describing an ability a device of the environment, the environment capability expressed as a configuration value of a configuration parameter; and identify the one or more configuration values for the one or more specific configuration parameters according to the set of preferences by identifying the one or more configuration values for the one or more specific configuration parameters according to the set of preferences and the environment capability.

19. A system for configuring a configurable device, comprising:

means for determining at a configuration manager that a configurable device has initiated interaction with an environment by detecting that the configurable device has entered a wireless detection range of the environment;

means for querying the configurable device in response to the detection to obtain a device request, the device request representing a request made by the configurable device to obtain one or more configuration values for one or more specific configuration parameters of a plurality of configuration parameters;

means for accessing a set of preferences, a preference indicating a configuration value for a configuration parameter of the plurality of configuration parameters, the set of preferences comprising a device-specific preference and an environment-specific preference;

means for identifying the one or more configuration values for the one or more specific configuration parameters according to the set of preferences;

means for generating a configuration instruction, the configuration instruction providing the one or more configuration values for the one or more specific configuration parameters;

means for transmitting the configuration instruction to the configurable device, the one or more configuration values used to configure the configurable device; and means for adding a sharable device capability of the configurable device to a plurality of environment capabilities of the environment.

20. A method for configuring a configurable device, comprising:

receiving one or more configuration values for one or more specific configuration parameters from configuration of a previous configurable device;

adding the one or more configuration values to a set of preferences, a preference indicating a configuration value for a configuration parameter of the plurality of configuration parameters, the set of preferences comprising a device-specific preference and an environment-specific preference;

determining at a configuration manager that a configurable device has initiated interaction with an environment by detecting that the configurable device has entered a wireless detection range of the environment, determining that the configurable device has initiated interaction with the environment further comprising:

receiving a signal from at least one of the configurable device and the environment, the signal indicating that at least one of the following has occurred:

the configurable device has detected the environment; and the environment has detected the configurable device; and determining that the configurable device has initiated interaction with the environment in response to receiving the signal;

querying the configurable device in response to the detection to obtain:
- a device request, the device request representing a request made by the configurable device to obtain the one or more configuration values for the one or more specific configuration parameters of a plurality of configuration parameters;
- a device capability, the device capability describing an ability of the configurable device, the device capability expressed as a configuration value of a configuration parameter; and
- an environment capability of the plurality of environment capabilities, the environment capability describing an ability a device of the environment, the environment capability expressed as a configuration value of a configuration parameter;

accessing the set of preferences;
identifying the one or more configuration values for the one or more specific configuration parameters according to the set of preferences, the device capability, and the environment capability;
generating a configuration instruction, the configuration instruction providing the one or more configuration values for the one or more specific configuration parameters;
transmitting the configuration instruction to the configurable device, the one or more configuration values used to configure the configurable device; and
adding a sharable device capability of the configurable device to a plurality of environment capabilities of the environment.

* * * * *